(12) United States Patent
Curtis

(10) Patent No.: US 8,517,579 B2
(45) Date of Patent: Aug. 27, 2013

(54) AIRCRAFT LIGHT UNIT

(75) Inventor: Matthew Curtis, Bristol (GB)

(73) Assignee: Airbus UK Limited, Bristol (GB)

( * ) Notice: Subject to any disclaimer, the term of this patent is extended or adjusted under 35 U.S.C. 154(b) by 627 days.

(21) Appl. No.: 12/673,493

(22) PCT Filed: Aug. 8, 2008

(86) PCT No.: PCT/GB2008/050680
§ 371 (c)(1),
(2), (4) Date: Feb. 13, 2010

(87) PCT Pub. No.: WO2009/022165
PCT Pub. Date: Feb. 19, 2009

(65) Prior Publication Data
US 2011/0198997 A1    Aug. 18, 2011

(30) Foreign Application Priority Data

Aug. 15, 2007 (GB) .................................. 0715887.6

(51) Int. Cl.
*F21V 1/20* (2006.01)
(52) U.S. Cl.
USPC ............................ 362/470; 362/471; 362/472
(58) Field of Classification Search
USPC .................................................. 362/470–472
See application file for complete search history.

(56) References Cited

U.S. PATENT DOCUMENTS

| 5,282,589 | A | 2/1994 | Branigan et al. |
| 5,315,296 | A * | 5/1994 | Kaiser et al. ................. 362/470 |
| 5,355,131 | A | 10/1994 | Metz et al. |
| 6,120,169 | A | 9/2000 | Sato |
| 6,963,293 | B1 * | 11/2005 | Rast ............................... 362/470 |
| 7,314,296 | B2 | 1/2008 | Machi et al. |
| 2001/0026452 | A1 | 10/2001 | Ganzer et al. |
| 2002/0075679 | A1 * | 6/2002 | Machi et al. ................... 362/247 |
| 2007/0183152 | A1 | 8/2007 | Hauck et al. |
| 2008/0137353 | A1 * | 6/2008 | Larsen et al. ................. 362/470 |

FOREIGN PATENT DOCUMENTS

| DE | 733385 C | 3/1943 |
| DE | 10159134 A1 | 6/2003 |
| FR | 2752206 A1 | 2/1998 |
| GB | 2329239 A | 3/1999 |
| WO | 2005/061324 A1 | 7/2005 |
| WO | 2006121939 A2 | 11/2006 |

OTHER PUBLICATIONS

UK Search Report for GB0715887.6 dated Dec. 3, 2007.
ISR and WO for PCT/GB2008/050680 mailed Nov. 19, 2008.

* cited by examiner

*Primary Examiner* — William Carter
(74) *Attorney, Agent, or Firm* — Lowe Hauptman Ham & Berner LLP

(57) ABSTRACT

This invention relates to aircraft light units, in particular aircraft light units used when landing and taxiing an aircraft. The invention provides an aircraft light unit comprising a first light source with a principal beam axis in a first direction and a second light source with a principal beam axis in a second direction, the second direction being different from the first direction. The first and second light sources are arranged such that they can combine to create a net light beam in a plurality of different directions by variation of the power supplied to the light sources.

25 Claims, 2 Drawing Sheets

AIRCRAFT LIGHT UNIT

RELATED APPLICATIONS

The present application is national phase of PCT/GB2008/050680 filed Aug. 8, 2008, and claims priority from British Application Number 0715887.6 filed Aug. 15, 2007, the disclosures of which are hereby incorporated by reference herein in their entirety.

BACKGROUND OF THE INVENTION

This application relates to aircraft light units, more particularly, but not exclusively, aircraft light units used when landing and/or taxiing an aircraft.

When an aircraft is landing in poor light conditions, which can be caused by poor weather and/or landing at night, it is necessary for the aircraft to illuminate the runway ahead of it in order that the pilot can land the aircraft safely. Aircraft can also vary in pitch when landing, for example, by 5 degrees or more. Therefore, the area which is it desirable to light in front of the aircraft changes position in respect to the aircraft.

Existing aircraft light units comprise filament based tungsten lamps situated at the bottom front end of the aircraft which are activated when the aircraft begins the landing approach. Once the aircraft has landed it may also be necessary to illuminate the runway when taxiing off the landing strip and filament based tungsten lamps are used again. They may be activated separately, or together with the landing light units.

Filament based tungsten lamps are inefficient and produce a large amount of heat during use. Filament based tungsten lamps typically have a broad distribution of intensity, meaning that as the aircraft is landing, only a small amount of the total light output illuminates the intended area.

Furthermore, due to aircraft vibration, filament based tungsten lamps have a short lifespan, needing, for example, replacement after between 30 and 100 hours of use. This leads to the aircraft requiring an increased amount of maintenance and increasing the aircraft running costs. Also, due to the high failure rate, a high level of redundancy is built into the lighting systems of an aircraft, increasing the aircraft weight.

A further factor which increases the weight of an aircraft is the fact that as an aircraft comes into land, the aircraft's pitch attitude, altitude and velocity relative to the ground varies. As a result, the area of runway that needs to be illuminated changes. In order to light these areas satisfactorily, it may be necessary to have a plurality of light units on an aircraft, each arranged to light a different area relative to the aircraft, thereby compensating for the change of aircraft position and velocity with respect to the ground. The greater the number of light units, the larger the weight of the aircraft, which has well known disadvantages for aircraft.

Certain aircraft light units have been provided with motors to actuate the light unit between different lighting positions, for example, see U.S. Pat. No. 5,355,131 (Metz et al). However, the addition of the motor adds both weight and complexity to the aircraft light unit.

The present invention seeks to mitigate or overcome one or more of the above-identified disadvantages associated with the prior art.

SUMMARY OF THE INVENTION

The invention provides an aircraft light unit comprising: a first light source with a principal beam axis in a first direction; and a second light source with a principal beam axis in a second direction, the second direction being different from the first direction; the first light source and second light source being arranged such that they can combine to create a net light beam in a plurality of different directions by variation of the power supplied to the light sources.

The principal beam axis of a light source is the direction in which the intensity of light emitted by the light source is greatest. The net light beam is created by the combination of the light distribution emitted by the first light source and the light distribution emitted by the second light source.

Advantageously, a single light unit can provide illumination in a plurality of different directions. Further advantageously, the light unit can provide illumination in a plurality of different directions without needing a motor to actuate any element of the light unit.

The invention also provides a method of varying the direction of illumination of an aircraft light unit, wherein the method comprises the steps of:

providing an aircraft light unit including a plurality of light sources, the plurality of light sources arranged to provide at least two different principal axis of illumination, and varying the power supplied to the plurality of light sources such that net beam created by the combination of the light sources varies in direction.

Advantageously, the direction of illumination of the light unit may be varied during the landing and taxiing of an aircraft, so as to compensate for the changes in aircraft pitch during the procedures. The direction of illumination may be varied in dependence on the pitch of the aircraft, and/or any other spatial or spatiotemporal characteristic of the aircraft. Such variation may be provided by a control unit, which may form a part of the light unit

DESCRIPTION OF THE DRAWINGS

An embodiment of the invention will now be described, by way of example only, with reference to the accompanying drawings of which.

DETAILED DESCRIPTION

Figure 1:
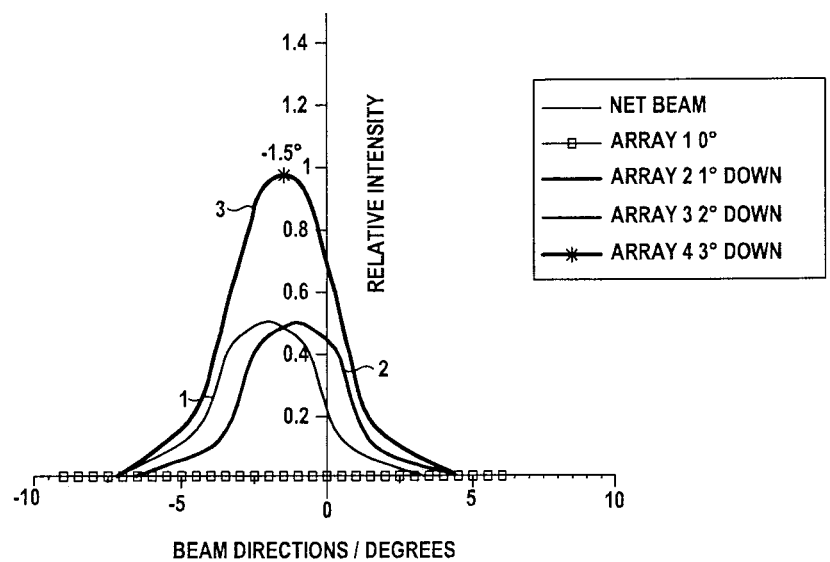
FIG. 1 demonstrates the net beam control principle.

FIG. 1 shows a graphical representation of the net light beam control principle as used by the light unit according to the invention. The horizontal axis of the graph represents the beam direction in degrees, in this case where 0 degrees represents the horizontal. When applied to an aircraft, the horizontal may be the horizontal axis of the aircraft, from the front of the aircraft to the rear of the aircraft. The vertical axis of the graph represents the intensity of the beam. Therefore, the bell curve 1 represents the intensity of a first light source over a range of degrees, with a principal beam axis (the direction in which the intensity of the light is greatest) of −2 degrees. The bell curve 2 represents the intensity of a second light source with a principal beam axis of −1 degree, the intensity and distribution of the second light source being the same as the first light source, other than for the principal beam axis. In this example, the first and second light sources are producing 50% of their maximum intensity.

The bell curve 3 shows how the first and second light source combine to create a net beam with a principal beam axis of −1.5 degrees, with an intensity of the first light source and second light source combined.

By varying the power supplied to the first light source and second light source, the principal beam axis of the net light beam can be varied. For example, if the required net light beam direction is between −1.5 degrees and −1 degree, the power to the first light source is decreased, say to 40% of the maximum intensity, and the power to the second light source is increased, say to 60% of the maximum intensity. The beams then combine to give a light beam between −1.5 degrees and −1 degree.

Figure 2:
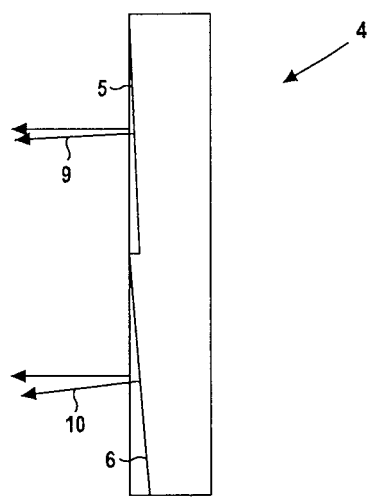
FIG. 2 shows a cut away side view of a light unit according to a first embodiment of the invention.
Figure 3:
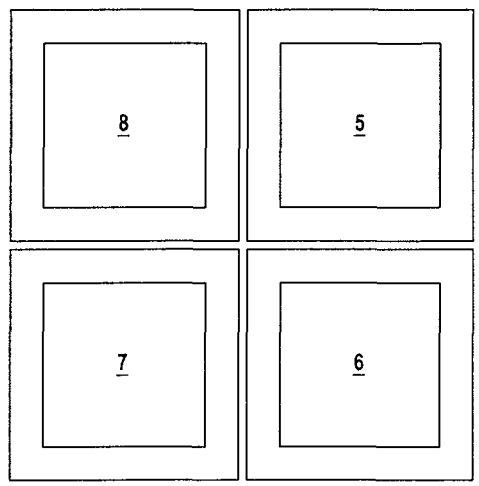
FIG. 3 shows a front-on view of the light unit according to the first embodiment of the invention.

FIG. 2 shows a cross-sectional side view of an embodiment of the invention, and FIG. 3 shows the front-on plan view of the embodiment shown in FIG. 3. The light unit 4 comprises four LEDs, 5, 6, 7 and 8, in a 2×2 arrangement. In this case there are four LEDs, each with a different orientation. In alternative embodiments there may be a plurality of LEDs that share an orientation, for example, by replacing each of the LEDs of the present embodiment by an LED array. The LEDs may be arranged differently, for example, in a 4×1 arrangement. Alternatively, there may be a different number of LEDs, for example, any number between 2 and 10 LEDs.

Use of LEDs is advantageous as they are smaller and lightweight relative to other light sources. Further advantageously, the optical components required to produce narrow distribution of light can be very small and are often integrated into the LED and its packaging. This is advantageous and contrasts with the large and weighty reflectors and lenses that are needed for filament lights. LEDs are also able to be powered at a variety of different levels and the transition time between changes of intensity is low. LEDs also have a long lifetime and are not as vulnerable to aircraft vibration as filament based tungsten lamps.

While not described in relation to the present embodiment, the light unit may include a focussing element associated with at least one of the light sources.

The aircraft light unit is arranged to be mounted on the exterior of an aircraft, for example the nose or main landing gear or leading edge of an aircraft wing.

The LEDs 5, 6, 7, and 8, are arranged with different orientations (−4 degrees, −6 degrees, −2 degrees and 0 degrees respectively), the orientations determining the principal beam axis of each LED. The angle of orientation is measured from a horizontal axis defined by the horizontal axis of the aircraft. FIG. 2 shows the principal beam axes 9 and 10, of LED 5 and LED 6 respectively. The light unit 4 is arranged such that the LED orientation is fixed relative to the light unit. Therefore, LED 8, at 0 degrees, is directed forwards along the horizontal axis of the aircraft. LED 7, at −2 degrees, is directed forwards and down at −2 degrees to the horizontal. The present embodiment is able to provide illumination with a principle beam axis between 0 degrees (by fully lighting LED 8) and −6 degrees (by fully lighting LED 6), and a large number of directions in between, by combining the light produced by different LEDs.

Figure 4:
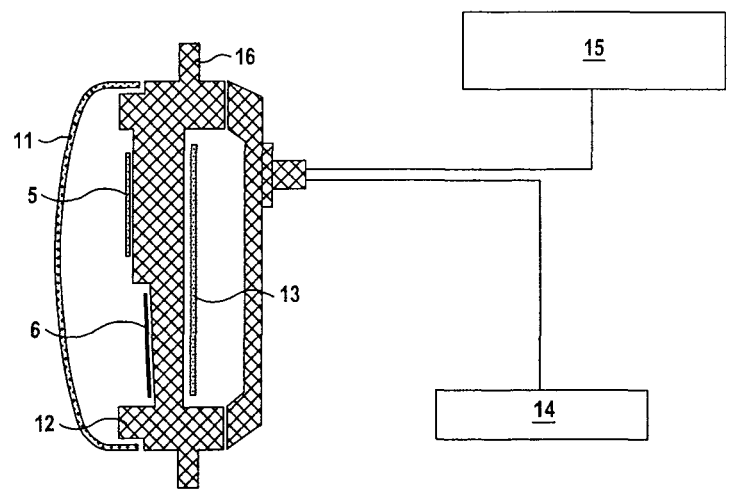
FIG. 4 shows a cut away side view of a light unit according to the invention showing the connections to the aircraft.

FIG. 4 shows the light unit as described for FIG. 2, with a transparent cover 11 protecting the LEDs, 5, 6, 7, and 8, a main body 12, to which the LEDs are attached, a control unit 13 which interfaces with the aircraft power system 14 and the aircraft pitch and altitude information 15 and lugs 16 extending from the main body 12 for attachment to the aircraft.

The light unit is connected to a control unit 13, which forms a part of the light unit in this embodiment, but could equally be provided separately. The control unit 13 arranged to be able to vary the power supplied to each of the LEDs, 5, 6, 7 and 8, and so vary the net beam created by a combination of the LEDs, 5, 6, 7, and 8. The control unit 13 may be arranged to condition the aircraft power into a form suitable for driving the light unit's LEDs, for example, using pulse width modulation.

The control unit 13 is also arranged such that it receives data relating to the aircraft pitch and altitude variation during the landing and taxiing of the aircraft. This may be through connection to a digital network on the aircraft which includes this information. The control unit 13 is arranged to control the net beam created by the LEDs, 5, 6, 7, and 8, in such a way that the optimum ground illumination is provided at all times during the landing and taxiing process. The control unit 13 may be arranged to turn the light unit off when the aircraft is above a certain altitude.

The optimum illumination conditions are stored in a memory associated with the control unit 13. The optimum illumination conditions may be dependent upon, among other things, the pitch, altitude, velocity, or other spatial or spatiotemporal characteristics of the aircraft. As will be appreciated by the person skilled in the art, different aircraft may have different characteristics during the landing and taxiing maneuvers, therefore, a light unit may be specifically arranged for use with a particular aircraft. Alternatively, the memory associated with the control unit 13 may be rewriteable depending on the particular aircraft on which it is to be used. In a further alternative, the memory may store information relating to a number of aircraft, the particular aircraft specified during installation of the light unit.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

For example, the net light beam may be varied in dependence on the velocity of the aircraft. The transparent cover 11 may act as a secondary optical component to focus the light emitted by the LEDs. The attachment lugs and/or the main body of the light unit may act as a heat sink for the light sources that make up the light unit. The light sources used in the light unit may be high intensity discharge lamps. The light unit may be used as a warning or signal light to other aircraft or air traffic controllers, flashing on and off to increase the aircraft visibility.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. An aircraft light unit comprising:
a first light source with a principal beam axis in a first direction; and
a second light source with a principal beam axis in a second direction, the second direction being different from the first direction;
a main body configured to be disposed on an aircraft, wherein said main body is self-mounted contained, and wherein said first and second light sources are mounted to said main body;
the first direction and second direction being fixed relative to the light unit;

the first light source and second light source being arranged such that they can combine to create a net light beam in a plurality of different directions by variation of a power supplied to the light sources.

2. An aircraft light unit as claimed in claim 1, being arranged such that the net light beam is varied in dependence on at least one spatial or spatiotemporal characteristic of the aircraft.

3. An aircraft light unit as claimed in claim 1, further comprising a control unit being arranged to control the power supplied to the first light source and second light source.

4. An aircraft light unit as claimed in claim 1, wherein at least one of the first light source and second light source is a LED.

5. An aircraft light unit as claimed in claim 1, further comprising an aircraft attachment point arranged such that it acts as a heat sink for the light source.

6. An aircraft light unit as claimed in claim 1, further comprising a third light source with a principal beam axis in a third direction, the third direction being different from the first direction and second direction, wherein the first light source, second light source and third light source are arranged such that they can combine to create a net light beam in a plurality of different directions by variation of the power supplied to the light sources.

7. An aircraft light unit as claimed in claim 6, further comprising a fourth light source with a principle beam axis in a fourth direction, the fourth direction being different from the first direction, the second direction and third direction, wherein the first light source, second light source, third light source and fourth light source are arranged such that they can combine to create a net light beam in a plurality of different directions by variation of the power supplied to the light sources.

8. An aircraft light unit as claimed in claim 1, wherein the aircraft light unit is in a form of an exterior light unit adapted for use on the outside of the aircraft.

9. An aircraft light unit as claimed in claim 1, wherein the lighting unit is one of a group consisting of a landing light, a taxi light and a combined landing and taxi light.

10. An aircraft light unit as claimed in claim 1 including an attachment structure facilitating mounting of the light unit on a leading edge of an aircraft wing.

11. An aircraft light unit as claimed in claim 1 including an attachment structure facilitating the mounting of the light unit on a nose or main landing gear of an aircraft.

12. An aircraft including an aircraft light unit as claimed in claim 1.

13. An aircraft light unit as claimed in claim 1, further comprising a transparent cover disposed over said main body.

14. A method of varying the direction of illumination of an aircraft light unit, wherein the method comprises:
  providing an aircraft light unit including a plurality of light sources, the plurality of light sources arranged to provide at least two different principal axes of illumination,
  providing a main body configured to be disposed on an aircraft, wherein said main mounted body is self-contained and wherein said plurality of light sources is mounted to said main body, and
  varying a power supplied to the plurality of light sources such that net beam created by a combination of the light sources varies in direction whilst respective axes of illumination remain fixed.

15. A method as claimed in claim 14, wherein the power is varied by a control unit associated with the light unit.

16. A method as claimed in claim 14, wherein the power supplied to the plurality of light sources is varied in dependence on at least one spatial or spatiotemporal characteristic of an aircraft.

17. A method as claimed in claim 14, wherein the method further comprises measuring the pitch of the aircraft and varying the direction of illumination of the light source in dependence on the measuring result.

18. A method as claimed in claim 14, wherein the method further comprises measuring the velocity of the aircraft and varying the direction of illumination of the light source in dependence on the measuring result.

19. A method as claimed in claim 14, wherein the method further comprises measuring the altitude of the aircraft and varying the direction of illumination of the light source in dependence on the result.

20. A method as claimed in claim 14, further comprising a transparent cover disposed over said main body.

21. An aircraft external light unit comprising:
  a first LED with a principal beam axis in a first direction; and
  a second LED with a principal beam axis in a second direction, the second direction being different from the first direction;
  a main body configured to be disposed on an aircraft, wherein said main body is self-mounted contained, and wherein said first LED and said second LED are mounted to said main body;
  wherein the first direction and second direction are fixed relative to the light unit; and
  the first light source and second light source being arranged such that they can combine to create a net light beam in a plurality of different directions by variation of a power supplied to the light sources.

22. An aircraft external light unit as claimed in claim 21, wherein the first direction and second direction are fixed relative to the aircraft when mounted thereon.

23. An aircraft light unit as claimed in of claim 21, further comprising a transparent cover disposed over said main body.

24. An aircraft light unit, comprising:
  a first light source with a principal beam axis in a first direction; and
  a second light source with a principal beam axis in a second direction, the second direction being different from the first direction;
  the first direction and second direction being fixed relative to the light unit;
  the first light source and second light source being arranged such that they can combine to create a net light beam in a plurality of different directions by variation of a power supplied to the light sources,
  a third light source with a principal beam axis in a third direction, the third direction being different from the first direction and second direction, wherein the first light source, second light source and third light source are arranged such that they can combine to create a net light beam in a plurality of different directions by variation of the power supplied to the light sources.

25. An aircraft light unit, comprising:
  a first light source with a principal beam axis in a first direction; and
  a second light source with a principal beam axis in a second direction, the second direction being different from the first direction;
  the first direction and second direction being fixed relative to the light unit;

the first light source and second light source being arranged such that they can combine to create a net light beam in a plurality of different directions by variation of a power supplied to the light sources, a third light source with a principal beam axis in a third direction, the third direction being different from the first direction and second direction, wherein the first light source, second light source and third light source are arranged such that they can combine to create a net light beam in a plurality of different directions by variation of the power supplied to the light sources, a fourth light source with a principle beam axis in a fourth direction, the fourth direction being different from the first direction, the second direction and third direction, wherein the first light source, second light source, third light source and fourth light source are arranged such that they can combine to create a net light beam in a plurality of different directions by variation of the power supplied to the light sources.

* * * * *